(12) United States Patent
Strandjord et al.

(10) Patent No.: US 9,354,064 B2
(45) Date of Patent: May 31, 2016

(54) RESONATOR FIBER OPTIC GYROSCOPE EMPLOYING COMMON CAVITY LENGTH MODULATION ALONG WITH HIGH BANDWIDTH LASER STABILIZATION

(71) Applicant: Honeywell International Inc., Morristown, NJ (US)

(72) Inventors: Lee K. Strandjord, Tonka Bay, MN (US); Glen A. Sanders, Scottsdale, AZ (US); Jianfeng Wu, Tucson, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 139 days.

(21) Appl. No.: 14/325,006

(22) Filed: Jul. 7, 2014

(65) Prior Publication Data

US 2016/0003619 A1    Jan. 7, 2016

(51) Int. Cl.
*G01C 19/72* (2006.01)

(52) U.S. Cl.
CPC ............ *G01C 19/727* (2013.01); *G01C 19/721* (2013.01)

(58) Field of Classification Search
CPC ............................ G01C 19/727; G01C 19/721
See application file for complete search history.

(56) References Cited

U.S. PATENT DOCUMENTS

| 7,463,360 | B2 | 12/2008 | Hughes et al. |
|---|---|---|---|
| 7,855,789 | B2 | 12/2010 | Strandjord et al. |
| 7,933,020 | B1 | 4/2011 | Strandjord et al. |
| 8,009,296 | B2 | 8/2011 | Sanders et al. |
| 8,213,019 | B2 | 7/2012 | Strandjord et al. |
| 8,223,341 | B2 | 7/2012 | Strandjord et al. |
| 8,259,301 | B2 | 9/2012 | Strandjord et al. |
| 8,294,900 | B2 | 10/2012 | Strandjord et al. |
| 2007/0133003 | A1 | 6/2007 | Sanders et al. |
| 2014/0044142 | A1 | 2/2014 | Strandjord et al. |
| 2015/0369605 | A1* | 12/2015 | Strandjord ........... G01C 19/721 356/461 |

FOREIGN PATENT DOCUMENTS

| EP | 2428767 | 3/2012 |
|---|---|---|
| EP | 2701250 | 2/2014 |

OTHER PUBLICATIONS

European Patent Office, "Extended European Search Report from EP Application No. 15169969.1 mailed Oct. 26, 2015", from Foreign Counterpart of U.S. Appl. No. 14/312,009, Oct. 26, 2015, pp. 1-10, Published in: EP.

(Continued)

*Primary Examiner* — Hwa Lee
(74) *Attorney, Agent, or Firm* — Fogg & Powers LLC

(57) ABSTRACT

A resonator fiber optic gyroscope comprises a master laser device that emits a reference optical signal, a first slave laser device that emits a clockwise optical signal, and a second slave laser device that emits a counter-clockwise optical signal. A resonator ring cavity is in communication with the master laser device and the slave laser devices. A sine wave generator is coupled to the resonator ring cavity and outputs a common cavity modulation frequency comprising in-phase and quadrature signals. A laser stabilization servo receives a clockwise reflection signal that includes the common cavity modulation frequency from the resonator ring cavity. A modulation stripper coupled to the servo receives the in-phase and quadrature signals, receives a net error signal from the servo, demodulates the net error signal at the common cavity modulation frequency, and transmits a stripper signal to the servo to remove the signal at the common cavity modulation frequency.

20 Claims, 2 Drawing Sheets

(56) References Cited

OTHER PUBLICATIONS

European Patent Office, "Extended European Search Report from EP Application No. 15164566.0 mailed Dec. 3, 2015", from Foreign Counterpart of U.S. Appl. No. 14/325,006, Dec. 3, 2015, pp. 1-7, Published in: EP.

U.S. Patent and Trademark Office, Office Action, from U.S. Appl. No. 14/312,009, Apr. 7, 2016, pp. 1-24, Published in: US.

* cited by examiner

RESONATOR FIBER OPTIC GYROSCOPE EMPLOYING COMMON CAVITY LENGTH MODULATION ALONG WITH HIGH BANDWIDTH LASER STABILIZATION

STATEMENT REGARDING FEDERALLY SPONSORED RESEARCH OR DEVELOPMENT

This invention was made with Government support under HR0011-08-C-0019 awarded by DARPA. The Government has certain rights in the invention.

BACKGROUND

The resonator fiber optic gyroscope (RFOG) has been developed to meet the needs of various navigation and inertial stabilization implementations. A promising RFOG architecture employs a very high speed laser stabilization loop to ensure very low relative frequency noise between the laser beams used for resonance tracking and the gyroscope resonator resonance frequencies. The laser stabilization loop uses the Pound-Drever-Hall technique to achieve a very high laser stabilization loop bandwidth. Significant reduction in gyroscope rate output noise has been realized by having a laser stabilization loop bandwidth significantly greater than the common modulation frequency used for resonance tracking. However, the requirement to have a laser stabilization loop bandwidth that is much greater than the resonance tracking modulation has forced conventional RFOG architectures to employ methods that have undesirable side effects.

To measure rotation rate, the RFOG must have at least two laser beams that counter-propagate through the gyroscope resonator to detect clockwise (CW) and counter clockwise (CCW) resonances. The relative frequencies between the two laser beams and a resonator resonance frequency are modulated to accurately detect the CW and CCW resonance frequencies, such modulation being called "resonance detection modulation" or "resonance tracking modulation." When the relative frequency between the CW laser beam and the resonator, and the CCW laser beam and the resonator, are modulated at the same frequencies and amplitude, this is known as "common resonance tracking modulation" or "common resonance detection modulation." This is because the resonance detection modulation (or resonance tracking modulation) is common to both the CW beam and CCW beam relative to the CW resonance and CCW resonance of the resonator, respectively. Use of common resonance detection modulation is very attractive because it offers gyroscope performance with a high degree of immunity to harmonic distortion errors and residual amplitude errors that may occur in the application of the resonance detection modulation. Cavity length modulation applied to the gyroscope resonator is a method of providing common resonance detection modulation that is highly immune to modulation errors. Thus, it is referred to as "common cavity length modulation" or "common cavity modulation" or "cavity length modulation." However, if the laser stabilization loop is directly applied to one of the laser beams used for gyroscope resonator resonance tracking and rotation sensing, then high-bandwidth laser stabilization will cancel out any resonance detection modulation being implemented via common cavity length modulation applied to the gyroscope resonator if the bandwidth of the laser stabilization loop is much greater than the cavity length modulation frequency.

To overcome this problem, conventional RFOG architectures employ at least a third laser, which becomes a master laser and the resonance tracking laser beams become slave lasers which are locked onto the master laser using optical phase lock loops (OPLLs). A portion of the master laser is combined with one of the slave lasers before entering the gyroscope resonator. The master laser is then locked to the gyroscope resonator using the Pound-Drever-Hall technique to obtain a very high bandwidth loop. To introduce a common resonance tracking modulation that is not canceled out by the laser stabilization loop, the common modulation is applied to only the slave laser beams. One method for doing this is modulating the portion of the master beam that is used as a reference for the optical phase lock loops between the master laser and slave lasers. However, there are many disadvantages to this method.

One disadvantage is that the resonance tracking modulation is not truly common between the two slaves. Differences in how the slave optical phase lock loops respond to the modulation on the master reference will result in rotation sensing errors. Another disadvantage is that the slave laser beams take different optical paths to the gyroscope resonator. Imperfections in the slave laser response to OPLL error signals, and imperfections in the optical components between the slave lasers and the gyroscope resonator, can cause errors in the resonance tracking modulation, and in particular, can cause intensity modulation at the same frequency. Any differences in the intensity modulation between the CW and CCW slave laser beams can result in rotation sensing errors. By taking different optical paths, differences in intensity modulation can occur.

SUMMARY

A resonator fiber optic gyroscope (RFOG) is provided that comprises a master laser assembly including a master laser device configured to emit a reference optical signal; a first slave laser assembly including a first slave laser device configured to emit a clockwise (CW) optical signal, the first slave laser device responsive to the reference optical signal through a CW optical phase lock loop; and a second slave laser assembly including a second slave laser device configured to emit a first counter-clockwise (CCW) optical signal, the second slave laser device responsive to the reference optical signal through a CCW optical phase lock loop. An optical resonator ring cavity is in optical communication with the master laser device, and each of the slave laser devices. A sine wave generator is operatively coupled to the resonator ring cavity and configured to output a common cavity modulation frequency comprising an in-phase (I) signal component and a quadrature (Q) signal component. A laser stabilization servo module is configured to receive a CW reflection signal that includes the common cavity modulation frequency from the resonator ring cavity. A modulation stripper is operatively coupled to laser stabilization servo module. The modulation stripper is configured to receive the I and Q signal components of the common cavity modulation frequency from the sine wave generator, receive a net error signal from the laser stabilization servo module, demodulate the net error signal at the common cavity modulation frequency, and transmit a stripper signal to the laser stabilization servo module to remove the signal at the common cavity modulation frequency. Resonance tracking electronics are operatively coupled to the resonator ring cavity and are configured to output resonance tracking error signals to the slave laser assemblies. The laser stabilization servo module is configured to send a tuning signal to the master laser device as part of a feedback stabilization loop for the master laser device.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A resonator fiber optic gyroscope (RFOG) is provided that employs common cavity length modulation for resonance tracking along with high bandwidth laser stabilization. A modulation stripper is employed that removes the signal generated by the common cavity modulation from a laser stabilization loop error signal. This allows the laser stabilization loop to not cancel out the common resonance detection modulation imparted by common cavity modulation. The modulation stripper employs synchronous detection and control loops to maintain a high degree of modulation stripping over all possible conditions and time.

A method of removing the common cavity modulation signal is to sum a signal that has the same frequency and amplitude of the laser stabilization loop error signal due to the common cavity modulation, but with the opposite sign (180 degrees phase) to the laser stabilization loop error signal. Therefore, the two signals cancel each other out before going to the laser stabilization loop servo (integrator) that controls the master laser frequency. One issue with this approach is that over time, as various gyroscope parameters drift, such as optical power, the cancellation becomes less perfect. Therefore, a method that maintains a required level of cancellation is also provided.

To maintain a high degree of cancellation over time and environmental changes (such as temperature) the present approach employs a control technique involving dual-phase synchronous detection. The net laser stabilization error signal (just before going into the servo) is tapped off and connected to in-phase and quadrature demodulators that demodulate the net error signal at the common cavity modulation frequency. The output of each demodulator then goes to a servo (integrator) that provides a control signal to a multiplier, which multiplies the control signal and either an in-phase or quadrature version of the common modulation. The outputs of the multipliers are therefore signals at the common modulation frequency that are amplitude controlled. The modulation stripper control loops ensure that no significant signal at the common modulation frequency reaches the laser stabilization loop servo, even if various gyroscope parameters change.

Further details of the present resonator fiber optic gyroscope (RFOG) are described hereafter with reference to the drawings.

Figure 1:
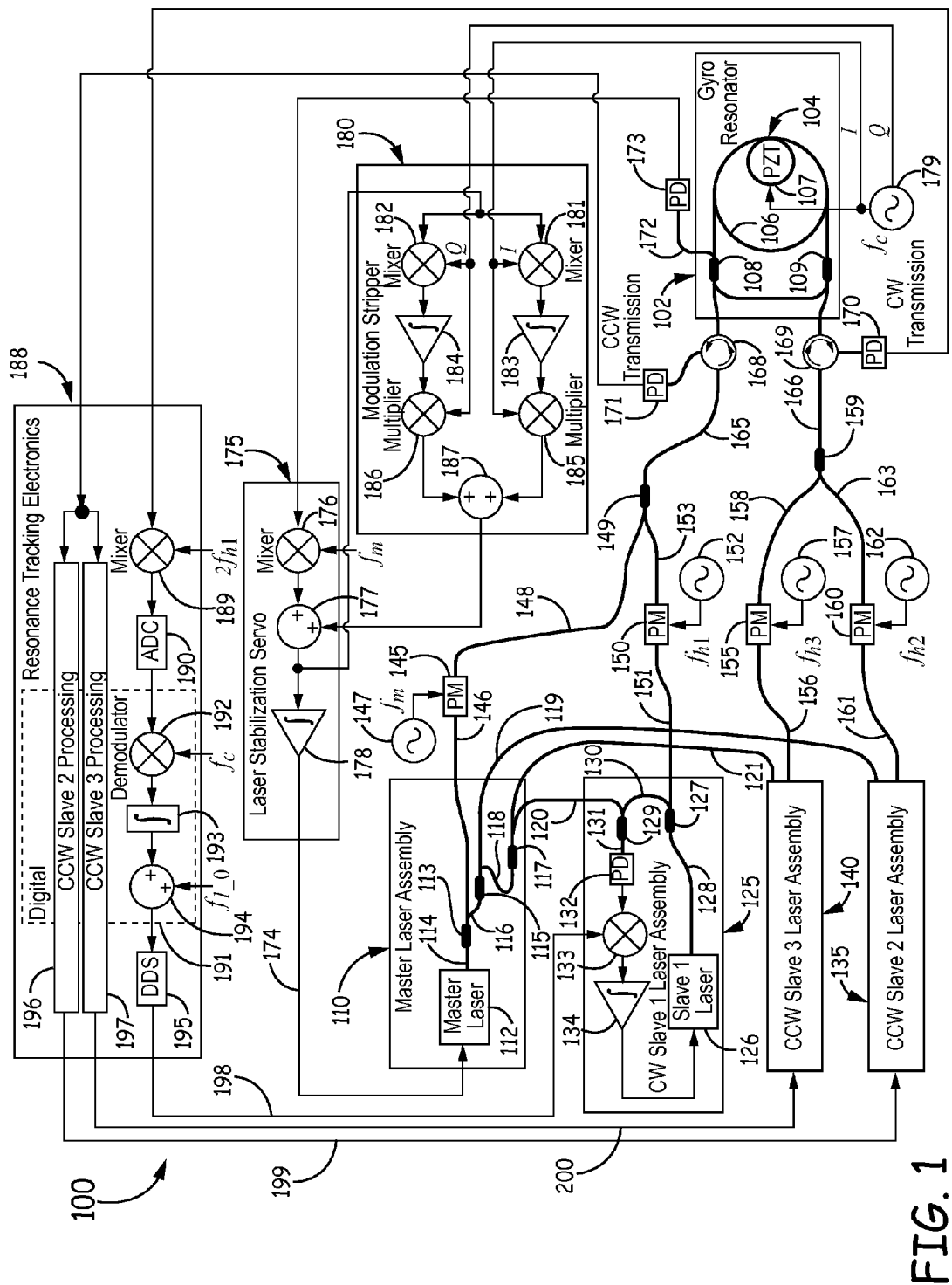
FIG. 1 is a block diagram of a resonator fiber optic gyroscope (RFOG) according to one embodiment.

FIG. 1 illustrates an RFOG 100 according to one embodiment. The RFOG 100 generally includes a gyroscope resonator 102, which is in optical communication with a master laser assembly 110, a first slave laser assembly 125, a second slave laser assembly 135, and an optional third slave laser assembly 140.

In one embodiment, gyroscope resonator 102 includes an optical ring cavity 104, which includes a fiber optic coil 106 wound around a core and about an axis around which rotation is sensed. A common cavity modulation scheme can be applied to ring cavity 104, such as with a piezoelectric (e.g., lead zirconate titanate, PZT) transducer wound with optical fiber to form an optical path-length modulator 107. The gyroscope resonator 102 also includes a pair of resonator couplers 108 and 109 that couple laser light from optical fibers into ring cavity 104.

In one embodiment, master laser assembly 110 includes a master laser device 112 configured to generate a reference optical signal that is directed to a first optical coupler 113 through an optical fiber 114. The first optical coupler 113 directs a portion of the reference optical signal to a second optical coupler 115 through an optical fiber 116. The second optical coupler 115 directs a portion of the reference optical signal to a third optical coupler 117 through an optical fiber 118. The second optical coupler 115 also directs a portion of the reference optical signal to second slave laser assembly 135 through an optical fiber 119. The third optical coupler 117 directs a portion of the reference optical signal to first slave laser assembly 125 through an optical fiber 120, and also directs a portion of the reference optical signal to optional third slave laser assembly 140 through an optical fiber 121.

The first slave laser assembly 125 includes a slave laser device 126 that is configured to generate a clockwise (CW) optical signal that is directed to a fourth optical coupler 127 through an optical fiber 128. The fourth optical coupler 127 directs a portion of the CW optical signal to a fifth optical coupler 129 through an optical fiber 130 as part of an optical phase lock loop for slave laser device 126. The optical coupler 129 combines the portion of the CW optical signal with a portion of the reference optical signal received through optical fiber 120. This combined optical signal is transmitted through an optical fiber 131 to a photodetector (PD) 132 such as a photodiode, which converts the combined optical signal to an electrical signal. This electrical signal is transmitted to a mixer 133, which also receives a resonance tracking control signal as discussed further hereafter. A mixed signal is sent to an integrator 134, which outputs a tuning signal to an input of slave laser device 126 for tuning the relative optical frequency between the CW optical signal and the reference optical signal.

The second slave laser assembly 135 includes similar components as first slave laser assembly 125, but is configured to generate a counter-clockwise (CCW) optical signal. Likewise, optional third slave laser assembly 140 includes similar components as first slave laser assembly 125, but is also configured to generate a CCW optical signal.

A first phase modulator (PM) 145 receives a portion of the reference optical signal from master laser device 112 through an optical fiber 146 connected to optical coupler 113. A laser stabilization modulation generator 147 provides a laser stabilization modulation frequency ($f_m$) to phase modulator 145. The phase modulator 145 is configured to modulate and stabilize the reference optical signal, which is output through an optical fiber 148 to a sixth optical coupler 149.

A second phase modulator 150 receives a portion of the CW optical signal from first slave laser device 126 through an optical fiber 151 connected to optical coupler 127. A high frequency modulation generator 152 provides a first high frequency modulation ($f_{h1}$) to phase modulator 150. The "high frequency" modulation that is provided is much higher than a resonator line width frequency. The phase modulator 150 is configured to modulate the CW optical signal phase at a unique frequency to allow a resonance tracking electronics module 188 (described further hereafter) to separate out the intended optical signal from other optical signals due to co-propagating laser beams or back-reflected laser beams. The phase modulator 150 outputs the CW optical signal through an optical fiber 153 to optical coupler 149.

A third phase modulator 160 receives a portion of the CCW optical signal from second slave laser assembly 135 through an optical fiber 161. A high frequency modulation generator 162 provides a second high frequency modulation ($f_{h2}$) to phase modulator 160. The phase modulator 160 is configured to modulate the CCW optical signal phase at a unique frequency to allow resonance tracking electronics module 188 to separate out the intended optical signal from other optical signals. The phase modulator 160 outputs the CCW optical signal through an optical fiber 163 to optical coupler 159.

When third slave laser assembly 140 is employed in RFOG 100, a fourth phase modulator 155 is implemented and receives a portion of the CCW optical signal from third slave laser assembly 140 through an optical fiber 156. A high frequency modulation generator 157 provides a third high frequency modulation ($f_{h3}$) to phase modulator 155. The phase modulator 155 is configured to modulate the CCW optical signal phase at a unique frequency to allow resonance tracking electronics module 188 to separate out the intended optical signal from other optical signals. The phase modulator 155 outputs the CCW optical signal through an optical fiber 158 to a seventh optical coupler 159.

The sixth optical coupler 149 combines the modulated reference optical signal from phase modulator 145 with the CW optical signal from phase modulator 150, and directs this combined CW optical signal to resonator 102 through an optical fiber 165. A first optical circulator 168 is located along the optical path between optical coupler 149 and resonator 102 along optical fiber 165. The resonator coupler 108 is configured to couple the combined CW optical signal into ring cavity 102 from optical fiber 165.

The seventh optical coupler 159 combines the CCW optical signals from phase modulators 155 and 160, and directs this combined CCW optical signal to resonator 102 through an optical fiber 166. A second optical circulator 169 is located along the optical path between optical coupler 159 and resonator 102 along optical fiber 166. A resonator coupler 109 is configured to couple the combined CCW optical signal into ring cavity 102 from optical fiber 166.

The resonator coupler 108 is also configured to send the combined CW optical signal reflected from ring cavity 104 through a reflection port, such as an optical fiber 172, to a reflection photodetector 173. An electrical CW reflection signal is transmitted from photodetector 173 to a laser stabilization servo module 175 such as a Pound-Drever-Hall (PDH) servo module. A laser stabilization loop mixer 176 in laser stabilization servo module 175 receives the CW reflection signal and the laser stabilization modulation frequency ($f_m$), and outputs a mixed signal to a first summer 177. The summer 177 also receives a stripper signal output from a modulation stripper 180, which is described further hereafter. The summer 177 outputs a reflection port resonance detection error signal to an integrator 178, and also sends the reflection port resonance detection error signal to an input of modulation stripper 180 in a feedback loop. The integrator 178 sends a tuning signal to an input of master laser device 112 as part of a master laser feedback stabilization loop 174.

In one embodiment, a common modulation generator 179 transmits a common cavity modulation frequency ($f_c$) to optical path-length modulator 107 in ring cavity 104. The common modulation generator 179 also sends in-phase (I) and quadrature (Q) signals to modulation stripper 180.

A first mixer 181 in modulation stripper 180 receives the I signal from common modulation generator 179 and also receives the signal output from summer 177. A second mixer 182 in modulation stripper 180 receives the Q signal from common modulation generator 179 and also receives the signal output from summer 177. A first integrator 183 in modulation stripper 180 receives a first mixed signal output from first mixer 181, and a second integrator 184 receives a second mixed signal output from second mixer 182. A first multiplier 185 in modulation stripper 180 receives the I signal from common modulation generator 179 and also receives the signal output from first integrator 183. A second multiplier 186 receives the Q signal from common modulation generator 179 and also receives the signal output from second integrator 184. The signals output from first and second multipliers 185, 186 are combined in a second summer 187, which outputs the stripper signal to first summer 177 in laser stabilization servo module 175.

A resonance tracking electronics module 188 is operatively coupled to circulator 169, which directs a portion of the CW optical signal from ring cavity 104 to a photodetector 170. The photodetector 170 converts the CW optical signal to an electrical CW transmission signal that is sent to resonance tracking electronics module 188 for processing.

A mixer 189 in resonance tracking electronics module 188 receives the CW transmission signal, and also receives a doubled first high frequency modulation ($2f_{h1}$), which is combined with the CW transmission signal. This combined signal is output from mixer 189 to an analog to digital converter (ADC) 190, which outputs a digital signal to a digital processing section 191. A demodulator 192 in digital processing section 191 receives the digital signal from ADC 190 and also receives the common cavity modulation frequency ($f_c$). A demodulated signal is output from demodulator 192 to an integrator 193, which outputs an integrated signal to a summer 194. The summer 194 also receives a digital word ($f_{1\_o}$) that represents the nominal frequency difference between the master laser frequency and the resonance frequency of the resonance mode onto which slave laser device 126 is locked. A direct digital synthesizer (DDS) 195 receives a control word signal output from summer 194, and sends a radio frequency (RF) tuning signal to mixer 133 in first slave laser assembly 125. This tuning signal is part of a CW resonance tracking loop 198, which provides a feedback for slave laser device 126 to lock its frequency to the CW resonance of ring cavity 104 by changing the relative optical frequency between slave laser device 126 and master laser device 112.

The resonance tracking electronics module 188 is also operatively coupled to circulator 168, which directs a portion of the CCW optical signal from ring cavity 104 to a photodetector 171. The photodetector 171 converts the CCW optical signal to an electrical CCW transmission signal that is sent to resonance tracking electronics module 188 for processing. A first CCW processing section 196 and an optional second CCW processing section 197 are configured to receive the CCW transmission signal. The CCW processing section 196 outputs a tuning signal to an input of second slave laser assembly 135. The CCW processing section 197 outputs a tuning signal to an input of optional third slave laser assembly 140 when employed. The CCW processing sections 196 and 197 both include similar components and functions as described previously for the processing of the CW transmission signal, except that processing section 196 receives a doubled second high frequency modulation ($2f_{h2}$), and processing section 197 receives a doubled third high frequency modulation ($2f_{h3}$). The tuning signals output from processing sections 196 and 197 are part of a respective CCW resonance tracking loops 199 and 200, which provide feedback for the slave laser devices in slave laser assemblies 135 and 140. This locks the frequency of these slave laser devices to the CCW resonance of ring cavity 104 by changing their relative optical frequencies with respect to master laser device 112.

The high frequency modulations ($f_{h1}$, $f_{h2}$, $f_{h3}$) provide unique signatures on each of the respective CW and CCW optical signals. This allows the CW and CCW resonance tracking electronics to separate out the various optical signals that reach photodetectors 170 and 171, as well as detect and process signals from only the desired beams.

Output signals from resonance tracking electronics module 188 can be processed by a central control unit (not shown) to determine the CW and CCW resonance frequency difference so that rotation rates can be measured.

It should be understood that the various optical couplers employed in RFOG 100 can be replaced with other optical components that perform similar functions, such as mirrors that partially reflect and partially transmit light, beam combiners, beam splitters, or other like devices.

Figure 2:
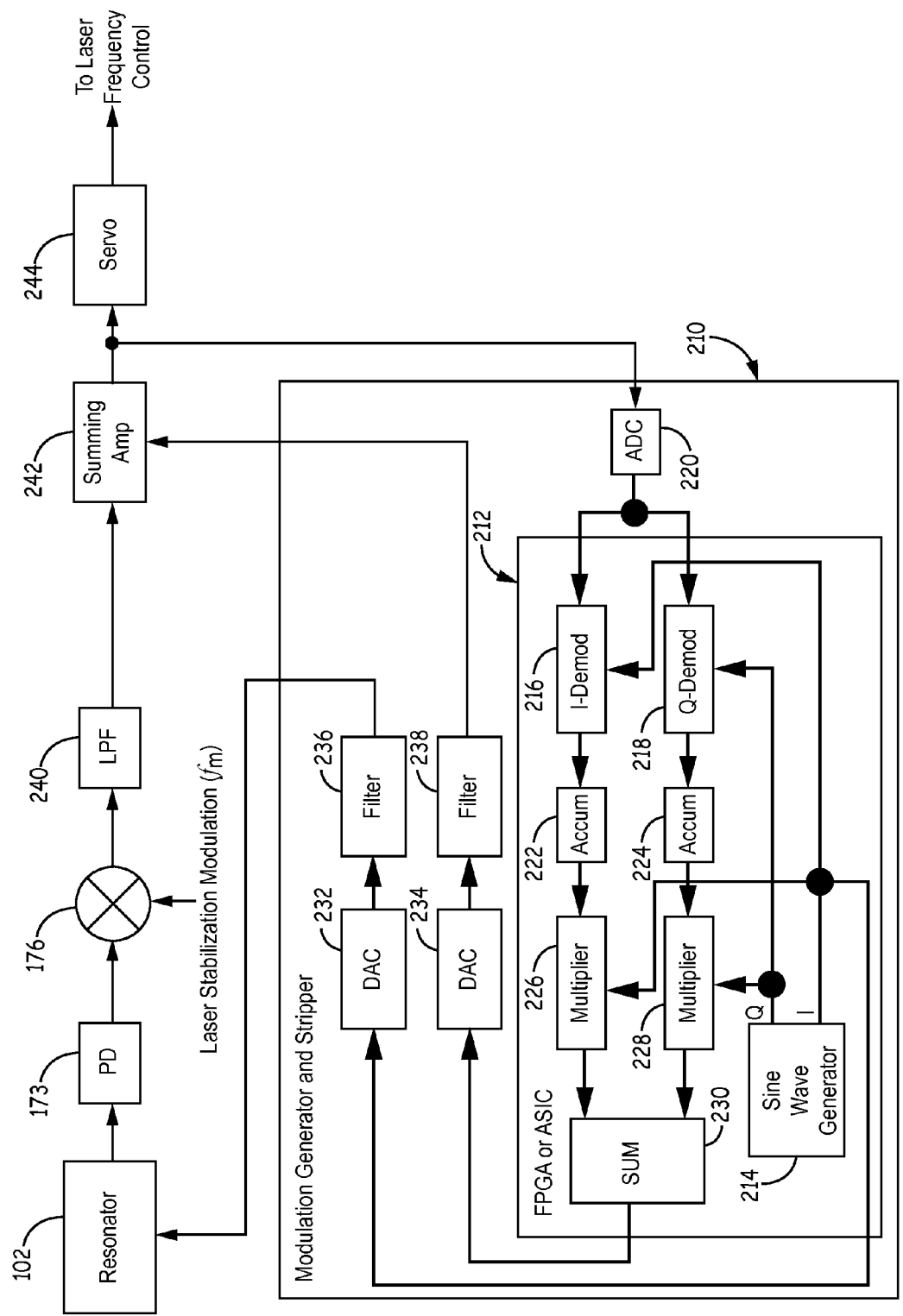
FIG. 2 is a block diagram of a modulation generator and stripper, which can be employed in an alternative embodiment of the RFOG of FIG. 1.

FIG. 2 illustrates a digital implementation of a modulation generator and stripper 210, which can be used in place of common modulator generator 179 and modulation stripper 180 in an alternative embodiment of RFOG 100 for the master laser stabilization loop. The modulation generator and stripper 210 includes a signal processing device 212, such as an application-specific integrated circuit (ASIC) or field programmable gate array (FPGA). A sine wave generator 214 outputs a digital sine wave that includes digital I and Q signals at a modulation frequency. For example, the modulation frequency can be in a range from about 7 kHz to about 20 kHz.

A first demodulator 216 in signal processing device 212 receives the digital I signal, and a second demodulator 218 in signal processing device 212 receives the digital Q signal. The first and second demodulators 216, 218 also receive a digital signal from an ADC 220, which receives an error signal from laser stabilization loop electronics that is described further hereafter. A demodulated digital I signal output from first demodulator 216 is sent to a first accumulator 222 in signal processing device 212, and a demodulated digital Q signal output from second demodulator 218 is sent to a second accumulator 224. A first digital control signal output from first accumulator 222 is sent to a first multiplier 226 in signal processing device 212, and a second digital control signal output from second accumulator 224 is sent to a second multiplier 228. The first multiplier 226 also receives the digital I signal from sine wave generator 214, and second multiplier 228 also receives the digital Q signal from sine wave generator 214. A summer 230 in signal processing device 212 combines the multiplied signals output from each of multipliers 226 and 228. A first digital to analog converter (DAC) 232 receives the digital I signal from sine wave generator 214, and a second DAC 234 receives a stripper signal output from summer 230.

The DAC 232 outputs an analog I signal to a first filter 236, which passes a filtered I signal to an input of resonator 102 that directs the I signal to optical path-length modulator 107 (FIG. 1). As shown in FIG. 2 (and described with respect to FIG. 1), resonator 102 outputs a reflected CW optical signal to reflection photodetector 173. An electrical CW reflection signal is transmitted from photodetector 173 to laser stabilization loop mixer 176, which also receives the laser stabilization modulation frequency ($f_m$). In the embodiment of FIG. 2, a mixed signal is output from mixer 176 to a low pass filter (LPF) 240, which passes a filtered signal to a summing amplifier 242.

The DAC 234 outputs an analog stripper signal to a second filter 238, which passes a filtered stripper signal to summing amplifier 242. The laser stabilization error signal at modulation frequency, such as a 7 kHz modulation frequency, is stripped by summing amplifier 242. An error signal output from summing amplifier 242 is sent to an input of ADC 220 as part of a control feedback loop for modulation generator and stripper 210. The error signal from summing amplifier 242 is also sent to an input of a servo 244, which includes integrator 178 (FIG. 1). The servo 244 outputs a tuning signal to laser frequency control electronics for the master laser.

A processor used in the present system and method can be implemented using software, firmware, hardware, or any appropriate combination thereof, as known to one of skill in the art. These may be supplemented by, or incorporated in, a specially-designed ASIC or FPGA. The present method can be implemented by computer executable instructions, such as program modules, which are executed by the processor. Generally, program modules include routines, objects, data components, data structures, algorithms, and the like.

Instructions for carrying out the various process tasks, calculations, and generation of other data used in the operation of the methods described herein can be implemented in software, firmware, or other computer or processor readable instructions. These instructions are typically stored on any appropriate machine readable medium used for storage of computer or processor readable instructions or data structures.

Suitable processor readable media may include storage or memory media such as magnetic or optical media. For example, storage or memory media may include volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

EXAMPLE EMBODIMENTS

Example 1 includes a resonator fiber optic gyroscope (RFOG), comprising: a master laser assembly including a master laser device configured to emit a reference optical signal; a first slave laser assembly including a first slave laser device configured to emit a clockwise (CW) optical signal, the first slave laser device responsive to the reference optical signal through a CW optical phase lock loop; a second slave laser assembly including a second slave laser device configured to emit a first counter-clockwise (CCW) optical signal, the second slave laser device responsive to the reference optical signal through a first CCW optical phase lock loop; an optical resonator ring cavity in optical communication with the master laser device, the first slave laser device, and the second slave laser device; a sine wave generator operatively coupled to the resonator ring cavity and configured to output a common cavity modulation frequency comprising an in-phase (I) signal component and a quadrature (Q) signal component; and a laser stabilization servo module configured to receive a CW reflection signal that includes the common cavity modulation frequency from the resonator ring cavity. A modulation stripper operatively coupled to the laser stabilization servo module is configured to: receive the I and Q signal components of the common cavity modulation frequency from the sine wave generator; receive a net error signal from the laser stabilization servo module; demodulate the net error signal at the common cavity modulation frequency; and transmit a stripper signal to the laser stabilization servo module to remove the signal at the common cavity modulation frequency. A resonance tracking electronics module operatively coupled to the resonator ring cavity is configured to output resonance tracking error signals to the first and second slave laser assemblies. The laser stabilization servo module is configured to send a tuning signal to the master laser device as part of a feedback stabilization loop for the master laser device.

Example 2 includes the RFOG of Example 1, wherein the laser stabilization servo module comprises: a mixer configured to receive the CW reflection signal and a laser stabilization modulation frequency; a summer configured to receive a mixed signal output from the mixer and the stripper signal from the modulation stripper, the summer configured to output the net error signal; and an integrator configured to receive the net error signal output from the summer and send the tuning signal to the master laser device.

Example 3 includes the RFOG of any of Examples 1-2, wherein the modulation stripper comprises: a first mixer that receives the I signal component from the sine wave generator and the net error signal from the laser stabilization servo module; a second mixer that receives the Q signal component from the sine wave generator and the net error signal; a first integrator that receives a mixed signal from the first mixer; a second integrator that receives a mixed signal from the second mixer; a first multiplier that receives a control signal output from the first integrator and the I signal component; a second multiplier that receives a control signal output from the second integrator and the Q signal component; and a summer that combines multiplied signals output from the first and second multipliers, and transmits the stripper signal to the laser stabilization servo module.

Example 4 includes the RFOG of any of Examples 1-2, wherein the sine wave generator and the modulation stripper are implemented together in a signal processing device.

Example 5 includes the RFOG of Example 4, wherein the signal processing device comprises an application-specific integrated circuit or a field programmable gate array.

Example 6 includes the RFOG of any of Examples 4-5, wherein the signal processing device comprises: a first demodulator that receives the I signal component from the sine wave generator; a second demodulator that receives the Q signal component from the sine wave generator; a first accumulator that receives a demodulated signal from the first demodulator; a second accumulator that receives a demodulated signal from the second demodulator; a first multiplier that receives a control signal from the first accumulator and the I signal component; a second multiplier that receives a control signal from the second accumulator and the Q signal component; and a summer that combines multiplied signals output from the first and second multipliers, and outputs a digital stripper signal.

Example 7 includes the RFOG of Example 6, further comprising: an analog to digital converter that receives the net error signal from the laser stabilization servo module and outputs a digital error signal to the first and second demodulators; a first digital to analog converter that receives the I signal component from the sine wave generator and outputs an analog I signal to the resonator ring cavity through a first filter; and a second digital to analog converter that receives the digital stripper signal from the summer and outputs an analog stripper signal to the laser stabilization servo module through a second filter.

Example 8 includes the RFOG of any of Examples 1-7, wherein the laser stabilization servo module comprises a Pound-Drever-Hall servo module.

Example 9 includes the RFOG of any of Examples 1-8, wherein the sine wave generator outputs a common cavity modulation frequency in a range from about 7 kHz to about 20 kHz.

Example 10 includes the RFOG of any of Examples 1-9, further comprising a first phase modulator in optical communication with the resonator ring cavity, the first phase modulator configured to apply a laser stabilization modulation frequency to a portion of the reference optical signal from the master laser device.

Example 11 includes the RFOG of Example 10, further comprising a second phase modulator in optical communication with the resonator ring cavity, the second phase modulator configured to apply a first high frequency modulation to a portion of the CW optical signal from the first slave laser device.

Example 12 includes the RFOG of Example 11, wherein a portion of the CW optical signal from the resonator ring cavity is directed to a first photodetector that converts the CW optical signal to an electrical CW transmission signal.

Example 13 includes the RFOG of Example 12, wherein the resonance tracking electronics module comprises: a first mixer that receives the CW transmission signal, and the first high frequency modulation that is doubled; a first analog to digital converter (ADC) that receives a mixed signal from the first mixer, and converts the mixed signal to a digital signal; a first demodulator that receives the digital signal from the first ADC, and the common cavity modulation frequency from the sine wave generator; a first integrator that receives a demodulated signal from the first demodulator; a first summer that receives an integrated signal from the first integrator, and a digital word; and a first direct digital synthesizer that receives a control word signal from the first summer, and sends a first radio frequency (RF) tuning signal to the first slave laser assembly.

Example 14 includes the RFOG of Example 13, further comprising a third phase modulator in optical communication with the resonator ring cavity, the third phase modulator configured to apply a second high frequency modulation to a portion of the CCW optical signal from the second slave laser device.

Example 15 includes the RFOG of Example 14, wherein a portion of the CCW optical signal from the resonator ring cavity is directed to a second photodetector that converts the CCW optical signal to an electrical CCW transmission signal.

Example 16 includes the RFOG of Example 15, wherein the resonance tracking electronics module further comprises: a second mixer that receives the CCW transmission signal, and the second high frequency modulation that is doubled; a second ADC that receives a mixed signal from the second mixer, and converts the mixed signal from the second mixer to a digital signal; a second demodulator that receives the digital signal from the second ADC, and the common cavity modulation frequency from the sine wave generator; a second integrator that receives a demodulated signal from the second demodulator; a second summer that receives an integrated signal from the second integrator, and a digital word; and a second direct digital synthesizer that receives a control word signal from the second summer, and sends a second RF tuning signal to the second slave laser assembly.

Example 17 includes the RFOG of Example 16, further comprising a third slave laser assembly including a third slave laser device configured to emit a second CCW optical signal, the third slave laser device responsive to the reference optical signal through a second CCW optical phase lock loop.

Example 18 includes the RFOG of Example 17, further comprising a fourth phase modulator in optical communication with the resonator ring cavity, the fourth phase modulator configured to apply a third high frequency modulation to a portion of the CCW optical signal from the third slave laser device.

Example 19 includes the RFOG of Example 18, wherein the resonance tracking electronics module further comprises: a third mixer that receives the CCW transmission signal, and the third high frequency modulation that is doubled; a third ADC that receives a mixed signal from the third mixer, and converts the mixed signal from the third mixer to a digital signal; a third demodulator that receives the digital signal from the third ADC, and the common cavity modulation frequency from the sine wave generator; a third integrator that receives a demodulated signal from the third demodulator; a third summer that receives an integrated signal from the third integrator, and a digital word; and a third direct digital synthesizer that receives a control word signal from the third summer, and sends a third RF tuning signal to the third slave laser assembly.

Example 20 includes a modulation generator and stripper for an RFOG, comprising: a signal processing device comprising a sine wave generator configured to output a digital sine wave that includes digital in-phase (I) and quadrature (Q) signal components at a modulation frequency; a first demodulator configured to receive the digital I signal component from the sine wave generator; a second demodulator configured to receive the digital Q signal component from the sine wave generator; a first accumulator configured to receive a demodulated signal from the first demodulator; a second accumulator configured to receive a demodulated signal from the second demodulator; a first multiplier configured to receive a control signal from the first accumulator, and the digital I signal component; a second multiplier configured to receive a control signal from the second accumulator, and the digital Q signal component; and a summer configured to combine multiplied signals from the first and second multipliers, and output a digital stripper signal. An analog to digital converter is configured to receive a net error signal from a laser stabilization servo of the RFOG, and output a digital error signal to the first and second demodulators. A first digital to analog converter is configured to receive the digital I signal component from the sine wave generator, and output an analog I signal to an optical resonator ring cavity of the RFOG. A second digital to analog converter is configured to receive the digital stripper signal from the summer, and output an analog stripper signal to the laser stabilization servo.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A resonator fiber optic gyroscope (RFOG), comprising:
    a master laser assembly including a master laser device configured to emit a reference optical signal;
    a first slave laser assembly including a first slave laser device configured to emit a clockwise (CW) optical signal, the first slave laser device responsive to the reference optical signal through a CW optical phase lock loop;
    a second slave laser assembly including a second slave laser device configured to emit a first counter-clockwise (CCW) optical signal, the second slave laser device responsive to the reference optical signal through a first CCW optical phase lock loop;
    an optical resonator ring cavity in optical communication with the master laser device, the first slave laser device, and the second slave laser device;
    a sine wave generator operatively coupled to the resonator ring cavity and configured to output a common cavity modulation frequency comprising an in-phase (I) signal component and a quadrature (Q) signal component;
    a laser stabilization servo module configured to receive a CW reflection signal that includes the common cavity modulation frequency from the resonator ring cavity;
    a modulation stripper operatively coupled to the laser stabilization servo module, the modulation stripper configured to:
        receive the I and Q signal components of the common cavity modulation frequency from the sine wave generator;
        receive a net error signal from the laser stabilization servo module;
        demodulate the net error signal at the common cavity modulation frequency; and
        transmit a stripper signal to the laser stabilization servo module to remove the signal at the common cavity modulation frequency; and
    a resonance tracking electronics module operatively coupled to the resonator ring cavity and configured to output resonance tracking error signals to the first and second slave laser assemblies;
    wherein the laser stabilization servo module is configured to send a tuning signal to the master laser device as part of a feedback stabilization loop for the master laser device.

2. The RFOG of claim 1, wherein the laser stabilization servo module comprises:
    a mixer configured to receive the CW reflection signal and a laser stabilization modulation frequency;
    a summer configured to receive a mixed signal output from the mixer and the stripper signal from the modulation stripper, the summer configured to output the net error signal; and
    an integrator configured to receive the net error signal output from the summer and send the tuning signal to the master laser device.

3. The RFOG of claim 1, wherein the modulation stripper comprises:
    a first mixer that receives the I signal component from the sine wave generator and the net error signal from the laser stabilization servo module;
    a second mixer that receives the Q signal component from the sine wave generator and the net error signal;
    a first integrator that receives a mixed signal from the first mixer;
    a second integrator that receives a mixed signal from the second mixer;
    a first multiplier that receives a control signal output from the first integrator and the I signal component;
    a second multiplier that receives a control signal output from the second integrator and the Q signal component; and
    a summer that combines multiplied signals output from the first and second multipliers, and transmits the stripper signal to the laser stabilization servo module.

4. The RFOG of claim 1, wherein the sine wave generator and the modulation stripper are implemented together in a signal processing device.

5. The RFOG of claim 4, wherein the signal processing device comprises an application-specific integrated circuit, or a field programmable gate array.

6. The RFOG of claim 4, wherein the signal processing device comprises:
a first demodulator that receives the I signal component from the sine wave generator;
a second demodulator that receives the Q signal component from the sine wave generator;
a first accumulator that receives a demodulated signal from the first demodulator;
a second accumulator that receives a demodulated signal from the second demodulator;
a first multiplier that receives a control signal from the first accumulator and the I signal component;
a second multiplier that receives a control signal from the second accumulator and the Q signal component; and
a summer that combines multiplied signals output from the first and second multipliers, and outputs a digital stripper signal.

7. The RFOG of claim 6, further comprising:
an analog to digital converter that receives the net error signal from the laser stabilization servo module and outputs a digital error signal to the first and second demodulators;
a first digital to analog converter that receives the I signal component from the sine wave generator and outputs an analog I signal to the resonator ring cavity through a first filter; and
a second digital to analog converter that receives the digital stripper signal from the summer and outputs an analog stripper signal to the laser stabilization servo module through a second filter.

8. The RFOG of claim 1, wherein the laser stabilization servo module comprises a Pound-Drever-Hall servo module.

9. The RFOG of claim 1, wherein the sine wave generator outputs a common cavity modulation frequency in a range from about 7 kHz to about 20 kHz.

10. The RFOG of claim 1, further comprising a first phase modulator in optical communication with the resonator ring cavity, the first phase modulator configured to apply a laser stabilization modulation frequency to a portion of the reference optical signal from the master laser device.

11. The RFOG of claim 10, further comprising a second phase modulator in optical communication with the resonator ring cavity, the second phase modulator configured to apply a first high frequency modulation to a portion of the CW optical signal from the first slave laser device.

12. The RFOG of claim 11, wherein a portion of the CW optical signal from the resonator ring cavity is directed to a first photodetector that converts the CW optical signal to an electrical CW transmission signal.

13. The RFOG of claim 12, wherein the resonance tracking electronics module comprises:
a first mixer that receives the CW transmission signal, and the first high frequency modulation that is doubled;
a first analog to digital converter (ADC) that receives a mixed signal from the first mixer, and converts the mixed signal to a digital signal;
a first demodulator that receives the digital signal from the first ADC, and the common cavity modulation frequency from the sine wave generator;
a first integrator that receives a demodulated signal from the first demodulator;
a first summer that receives an integrated signal from the first integrator, and a digital word; and
a first direct digital synthesizer that receives a control word signal from the first summer, and sends a first radio frequency (RF) tuning signal to the first slave laser assembly.

14. The RFOG of claim 13, further comprising a third phase modulator in optical communication with the resonator ring cavity, the third phase modulator configured to apply a second high frequency modulation to a portion of the CCW optical signal from the second slave laser device.

15. The RFOG of claim 14, wherein a portion of the CCW optical signal from the resonator ring cavity is directed to a second photodetector that converts the CCW optical signal to an electrical CCW transmission signal.

16. The RFOG of claim 15, wherein the resonance tracking electronics module further comprises:
a second mixer that receives the CCW transmission signal, and the second high frequency modulation that is doubled;
a second ADC that receives a mixed signal from the second mixer, and converts the mixed signal from the second mixer to a digital signal;
a second demodulator that receives the digital signal from the second ADC, and the common cavity modulation frequency from the sine wave generator;
a second integrator that receives a demodulated signal from the second demodulator;
a second summer that receives an integrated signal from the second integrator, and a digital word; and
a second direct digital synthesizer that receives a control word signal from the second summer, and sends a second RF tuning signal to the second slave laser assembly.

17. The RFOG of claim 16, further comprising a third slave laser assembly including a third slave laser device configured to emit a second CCW optical signal, the third slave laser device responsive to the reference optical signal through a second CCW optical phase lock loop.

18. The RFOG of claim 17, further comprising a fourth phase modulator in optical communication with the resonator ring cavity, the fourth phase modulator configured to apply a third high frequency modulation to a portion of the CCW optical signal from the third slave laser device.

19. The RFOG of claim 18, wherein the resonance tracking electronics module further comprises:
a third mixer that receives the CCW transmission signal, and the third high frequency modulation that is doubled;
a third ADC that receives a mixed signal from the third mixer, and converts the mixed signal from the third mixer to a digital signal;
a third demodulator that receives the digital signal from the third ADC, and the common cavity modulation frequency from the sine wave generator;
a third integrator that receives a demodulated signal from the third demodulator;
a third summer that receives an integrated signal from the third integrator, and a digital word; and
a third direct digital synthesizer that receives a control word signal from the third summer, and sends a third RF tuning signal to the third slave laser assembly.

20. A modulation generator and stripper for a resonator fiber optic gyroscope (RFOG), comprising:
a signal processing device comprising:
a sine wave generator configured to output a digital sine wave that includes digital in-phase (I) and quadrature (Q) signal components at a modulation frequency;

a first demodulator configured to receive the digital I signal component from the sine wave generator;
a second demodulator configured to receive the digital Q signal component from the sine wave generator;
a first accumulator configured to receive a demodulated signal from the first demodulator;
a second accumulator configured to receive a demodulated signal from the second demodulator;
a first multiplier configured to receive a control signal from the first accumulator, and the digital I signal component;
a second multiplier configured to receive a control signal from the second accumulator, and the digital Q signal component; and
a summer configured to combine multiplied signals from the first and second multipliers, and output a digital stripper signal;
an analog to digital converter configured to receive a net error signal from a laser stabilization servo of the RFOG, and output a digital error signal to the first and second demodulators;
a first digital to analog converter configured to receive the digital I signal component from the sine wave generator, and output an analog I signal to an optical resonator ring cavity of the RFOG; and
a second digital to analog converter configured to receive the digital stripper signal from the summer, and output an analog stripper signal to the laser stabilization servo.

* * * * *